Sept. 26, 1961  G. A. LYON  3,001,495
METHOD OF AND MEANS FOR MAKING WHEEL COVERS
Filed Jan. 24, 1957  2 Sheets-Sheet 2
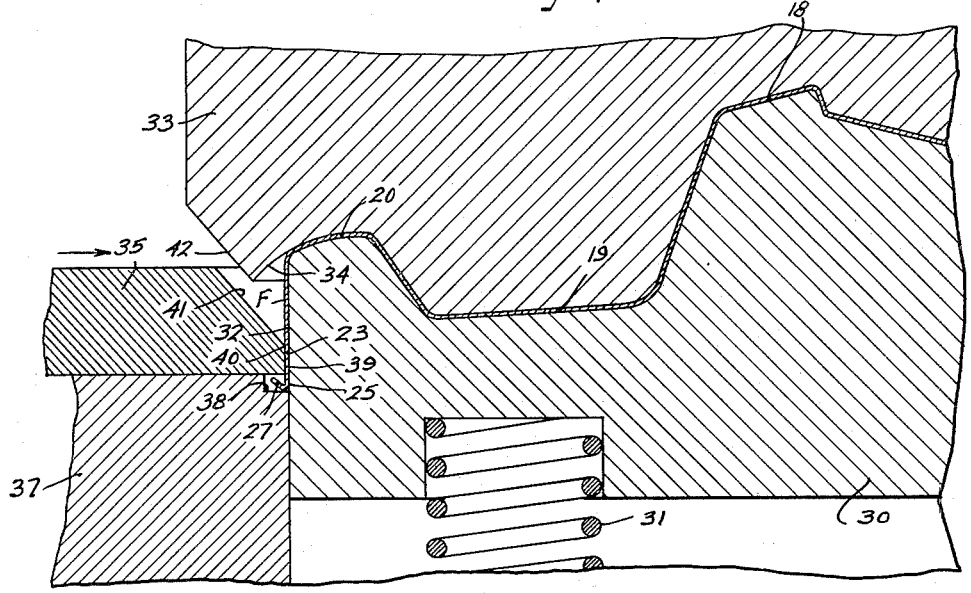
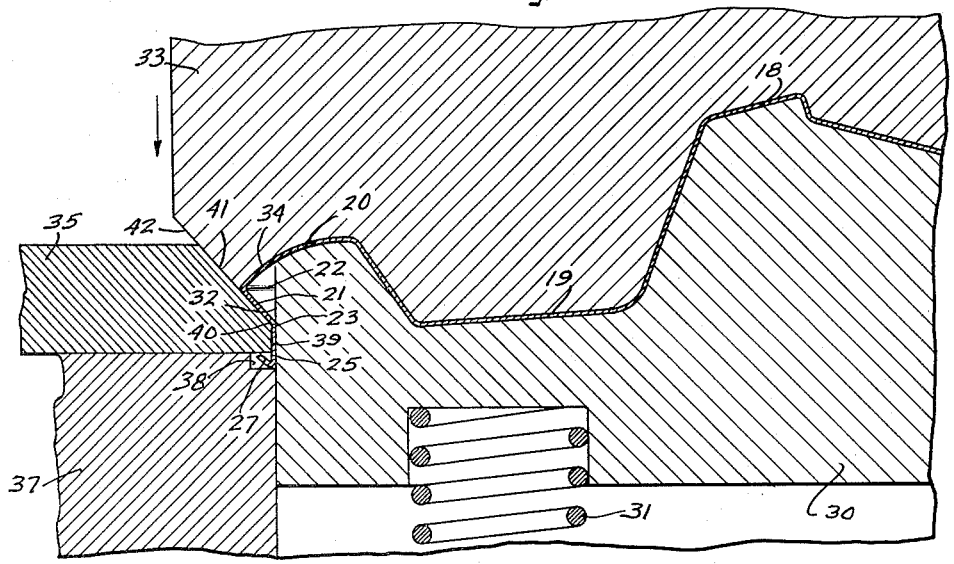
Inventor
GEORGE ALBERT LYON

United States Patent Office 3,001,495  
Patented Sept. 26, 1961

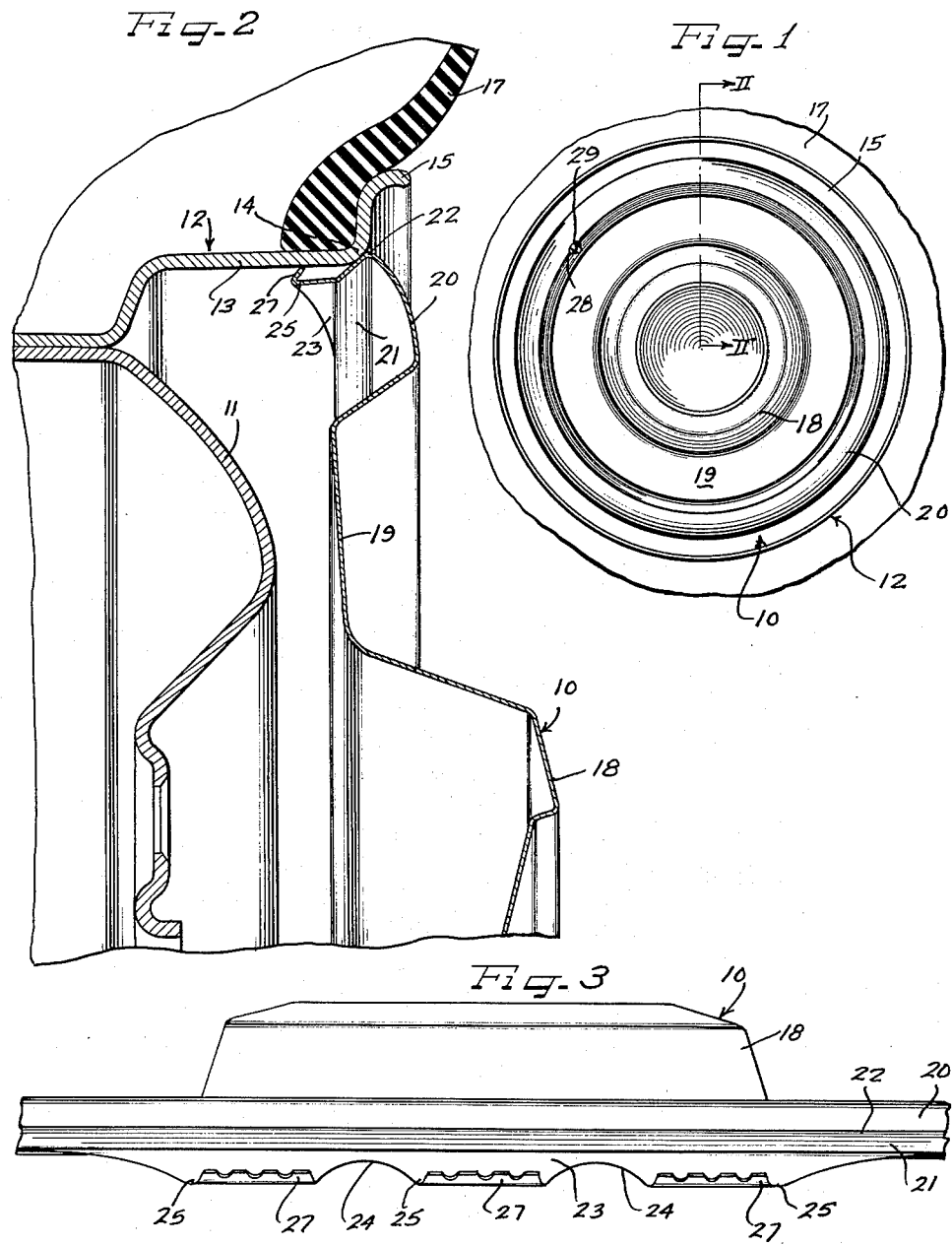

3,001,495
METHOD OF AND MEANS FOR MAKING
WHEEL COVERS
George Albert Lyon, 13881 W. Chicago Blvd.,
Detroit 28, Mich.
Filed Jan. 24, 1957, Ser. No. 636,008
3 Claims. (Cl. 113—116)

The present invention relates to improvements in making wheel covers and more particularly covers for disposition in ornamental and protective covering at the outer sides of vehicle wheels.

Wheel covers of the self-retaining type having outer marginal retaining flange structure such as retaining fingers engageable with the tire rim present a problem in respect to the formation of the marginal structure of the cover for not only concealingly disposing the retaining structure behind the cover margin, but also in providing in addition to the retaining fingers a cover bottoming shoulder or stop structure engageable with the tire rim to determine the axially inward disposition of the cover on the wheel. The problem arises primarily from the desirability of step-by-step drawing and shaping of the marginal portion of the cover for forming and working the retaining structure into position toward the inner side of the cover from an originally flat sheet metal piece or blank.

According to the present invention, it is an important object to provide an improved method for shaping the marginal portion of a circular wheel cover formation to concealingly dispose cover retaining means behind the cover margin.

Another object of the invention is to provide an improved method of forming sheet metal covers from flat stock to provide therebehind concealed cover retaining means projecting axially and in the final cover disposed radially inwardly from the peripheral extremity of the cover.

A still further object of the invention is to provide an improved method of concealing behind the periphery of wheel covers, cover retaining fingers or like retaining means.

Yet another object of the invention is to provide improved means for making wheel covers.

It is a still further object of the invention to provide improved die apparatus for turning a marginal portion of a wheel cover formation into concealing relation to cover retaining finger means or the like behind the cover.

Other objects, features and advantages of the present invention will be readily apparent from the following detailed description of a preferred embodiment thereof taken in conjunction with the accompanying drawings in which:

FIGURE 1 is an outer side elevational view of a wheel structure embodying a cover made according to the present invention;

FIGURE 2 is an enlarged fragmentary radial sectional detail view taken substantially on the line II—II of FIGURE 1;

FIGURE 3 is a fragmentary edge elevational view of the cover of FIGURES 1 and 2;

FIGURE 4 is a fragmentary radial sectional detail view through die apparatus by which the present invention is adapted to be practiced; and FIGURE 5 is a fragmentary vertical radial sectional detail view similar to FIGURE 4 but showing the apparatus as it appears at the conclusion of a forming stroke thereof.

Having reference first to FIGURES 1, 2 and 3, a wheel cover 10 made according to the present invention is adapted to be mounted on the outer side of a vehicle wheel including a disk spider wheel body 11 supporting a tire rim 12 including a generally radially inwardly facing annular and axially outwardly extending intermediate flange 13 merging at a shoulder 14 with a generally radially outwardly and then axially outwardly turned terminal flange 15. The tire rim 12 is adapted to support a pneumatic tire 17.

The wheel cover 10 is constructed to be made from a single piece of sheet metal stock such as stainless steel, brass or the like adapted to be press-worked or drawn into shape and work hardened to afford self-retaining marginal cover retaining structure. To this end, the cover 10 comprises a central circular crown portion 18 with an intermediate annular inset or dished portion 19 having thereabout an annular axially outwardly extending marginal rib-like structure 20 of a diameter to overlie the tire rim and more particularly the intermediate flange 13 and the shoulder 14 of the tire rim. In this instance, the cross-sectional shape or contour of the marginal rib structure 20 is generally convex and sloping generally radially outwardly and axially inwardly to an underturned continuous annular flange 21 joining the marginal cover portion 20 at a juncture small radius rib-like finishing and reinforcing extremity 22. From the juncture 22 the flange 21 extends obliquely generally radially and axially inwardly and provides a generally frusto-conical centering and axial disposition determining bottoming or seat portion engageable with the juncture shoulder 14 of the tire rim in a generally wedging self-centering relation and with the inner extremity of the flange 21 extending generally radially inwardly into spaced telescoped relation to the axially outer portion of the intermediate flange 13 adjacent to the juncture shoulder 14.

Extending generally axially inwardly as integral one-piece extension from the underturned seating flange 21 is cover retaining structure herein comprising a circumferentially spaced series of cover retaining fingers 23 of substantial width and preferably sub-divided by shallow cutouts 24 into individual finger extensions 25 from the main wide finger body. Each of the extensions 25 has a generally radially and axially outwardly oblique short and stiff cover retaining terminal 27 which is engageable at its edge with the opposing inner surface of the intermediate flange 13. Normally the diameter to which the tips of the retaining finger terminal leg flanges 27 extend is of a slightly larger diameter than the diameter of the opposing portion of the intermediate flange, but on pressing the cover home on the wheel, the retaining terminals 27 cam inwardly along the intermediate flange 13 and are compressed radially inwardly and thus place the retaining fingers 23 under resilient tensioned deflection which thrusts the retaining terminal tips into gripping retaining relation to the surface of the intermediate flange. There may be four of the retaining finger extension structures 23 equidistantly spaced and derived from four corners a quadrangular sheet metal blank from which the cover may be made.

In applying the cover to the outer side of the wheel, a valve stem aperture 28 is registered with respect to a valve stem 29 and the cover then pressed into retaining engagement with the wheel until the underturned flange 21 seats against the shoulder 14. Removal of the cover is adapted to be effected by means of a convenient pry-off tool such as a screwdriver inserted between the tire rim shoulder 14 and the seating flange 22.

In making the cover 10, a problem that has had to be overcome resides in getting the retaining fingers 23 into concealed relation behind the marginal portion 20 of the cover and into radially inward clearance relation to the seating or shouldering portion of the underturned flange 21. Herein this is accomplished by first constructing the retaining fingers 23 and the flange 21 as a generally cylindrically shaped axially inward extension about a cover formation that is of an edge diameter the same as the axially extending fingers 23, and thereafter and following formation of the fingers bending the axially extending flange portion axially outwardly from the fingers generally radially outwardly into overlying, concealing and bottoming seat forming relation to the fingers. This is accomplished in the manner shown and in the die structure depicted in FIGURES 4 and 5.

In preliminary steps in the making of the cover 10, a flat sheet metal blank preferably derived from strip stock, is drawn to shape in suitable drawing dies to provide the crown portion 18, the intermediate dished portion 19 and the radially inner part of the annular marginal portion 20, and with a preferably generally cylindrical axially inwardly extending flange F defining the perimeter of the partially formed or shaped cover. It will be understood, of course, that in the initial phase or step in the formation of the flange F, it will lie flat so that trimming of the retaining fingers is facilitated. Then, the flange F is cold worked into the generally cylindrical form shown in FIGURE 4. At this time, also, the retaining finger terminals 27 are bent up. The flange F is therefore on the diameter of the finger extensions 23 which extend generally axially as extensions from the inner extremity of the flange F. It will be appreciated that in the cold working of the flange F and the finger extensions 23, 25, substantial hardening and resiliency are imparted thereto.

The thus formed cover blank is placed upon a yieldably mounted and complementarily contoured supporting die or pad structure 30 carried by springs 31. The die member 30 has the upper surface thereof contoured to fit into the inner side of the shaped cover plate, with a cylindrical peripheral wall surface 32 closely opposing the radially inner surface of the flange F.

Clampingly cooperable with the lower die pad member 30 is a relatively and jointly reciprocable upper die member 33 which is constructed and arranged to be driven in a cover clamping and forming stroke and then backed off to clear the lower die assembly in suitable power press equipment. The lower face of the die member 33 is contoured complementary to the outer face of the cover plate to engage the same and clamp the cover plate against the lower supporting die pad member 30. Marginally the lower face of the upper die member 33 is provided with an annular cross-sectionally concave clamping and forming surface 34 which is complementary to and conformable to the preferred shape of the completed marginal cover portion 20, with the radially outer portion of the forming surface 34 extending radially beyond juncture of the flange F with the initially formed section of the cover portion 20 and overlying the retaining finger terminals 27 as shown in FIGURE 4.

Properly coordinated in operation with the reciprocable forming die member 33 are means cooperable therewith to effect final shaping of the cover margin. In a practical form, such means may comprise a coactive series of cam die members 35 of which one is shown in FIGURES 4 and 5 but which it will be understood will comprise a suitable series disposed about the die assembly and radially reciprocably mounted upon a stationary supporting die base or bed structure 37 which may also serve as a reciprocable guide for the central supporting pad die member 30. By way of example, the cam die members 35 may be of the general order and operation of such structure disclosed in my Patent 2,744,426 issued May 8, 1956.

For receiving the retaining finger terminals 27 in clearance relation below the path of movement of the cam die members 35, the die structure 37 may be provided with an upper inner marginal recess 38 which also provides a supporting shoulder for the inner extremities of the retaining finger extensions 25 and more particularly the junctures of such finger extensions with the retaining terminal flange legs 27.

In a cycle of operation, the partially preformed cover blank as shown in FIGURE 4 is placed upon the lower die pad member 30 while the upper die member 33 is in a backed off clearance relation thereto. Then the upper die member 33 is moved into clamping relation to the cover blank and presses the retaining finger extremities against the shoulder within the recess 38. Thereupon, the cam die members or segments 35 are moved radially inwardly from a backed off clearance relation toward the cylindrical die surface 32. This brings respective clamping nose cylindrical surfaces 39 on the cam die segments 35 into firm clamping, thrusting engagement against the retaining finger portions 23 of the flange F. The upper ends of the respective clamping nose surfaces 39 which are complementary to the die surface 32, terminate at a fulcrum ridge juncture 40 with a generally radially outwardly and axially upwardly oblique forming surface 41 which is contoured complementary to the ultimate shape desired in the underturned flange portion 21 of the cover.

After these preparatory actions of the die assembly have been completed, the upper die member 33 moves a further and final increment of its stroke which comprises the actual forming portion of the stroke and terminates when a stop shoulder surface 42 on the die member 33 engages the die segments 35, as for example by engagement with the outer portion of the die segment diagonal surface 41. As the forming stroke progresses toward the conclusion, the marginal flange F is intermediately bulged or buckled generally radially outwardly, with the fulcrum ridge or rib 40 serving as a bending guide as the cover plate and more particularly the marginal portion 20 is moved axially inwardly toward the retaining fingers 23 while the retaining finger portions 23 of the flange F are held fixedly stationary upon the shoulder provided by the lower die member 37. The upper or axially outermost portion of the flange F bends out and conforms to the overlying forming surface 34 while the portion of the flange F immediately axially inwardly adjacent thereto bends out and conforms to the oblique forming surface 41, to thereby provide the underturned flange portion 21. At the completion of the forming stroke, the axially outer portion of the flange F merges into the contour of the cover marginal portion 20 to provide the radially outer portion thereof with the finishing rib juncture extremity 22 joining the same with the underturned flange portion 21. In the meantime, of course, the retaining finger portions 23 have been held to the diameter of the forming surface 32 and the cooperating forming nose surfaces 39 and now are disposed in concealed radially inward relation behind the cover marginal portion 20 and which marginal portion has now been contracted axially inwardly toward the retaining fingers.

Upon backing off of the cam die segments 35 and the upper die member 33, the now at least substantially completed cover 10 can be removed from the die assembly to receive any further sizing that may be desirable, or embossing, and of course finishing such as polishing and plating or painting that may be desired.

While a particular convex contour has been shown for the cover marginal portion 20, it will be appreciated that this may be varied to afford design variations while still enabling shaping of the cover marginal structure according to the present method.

It will be understood that modifications and variations may be effected without departing from the scope of the novel concepts of the present invention.

I claim as my invention:

1. In a method of making sheet metal wheel covers, shaping a sheet metal blank into a circular cover form with a generally cylindrical axially inwardly extending peripheral flange, forming on the inner extremity portion of the flange cover retaining means, supporting the cover form with said inner extremity portion of the flange from an intermediate annular line axially inwardly held stationary against both axial and radial movement, and applying axially inward pressure against the flange toward said inner extremity portion of the flange to collapse the flange along said intermediate annular line to bulge radially outwardly into a circular retaining-means-concealing larger diameter marginal cover perimeter.

2. In combination in sheet metal cover forming apparatus, a circular reciprocable supporting pad die member engageable with the axially inner face of a preformed circular cover plate having a peripheral substantially cylindrical axially inwardly extending flange, said pad die member having a cylindrical surface opposing the radially inner side of said flange complementally, a reciprocable clamping and shaping die structure cooperable with the pad die member to engage the axially outer side of and clamp the cover plate against the pad die member and movable axially therewith in a forming stroke, said die structure having marginal forming means projecting radially outwardly beyond the diameter of the cover flange and said cylindrical surface, stationary die means encompassing said pad die member and serving as a reciprocable guide therefor and having a radially inner marginal portion against which the axially inner extremity of the cover flange is stationarily thrustable, and segment die structure mounted reciprocably upon said stationary die means and movable toward and away from said cylindrical surface and having complementary cylindrical clamping nose portions for thrusting clampingly against the radially outer side of the inner end portion of the cover flange to clamp it against said cylindrical surface, said segmental die structure having forming surfaces thereon opposing the marginal forming means of said shaping die structure and coacting therewith during a forming stroke movement thereof and compression of the cover flange to reshape an intermediate portion of the cover flange during radially outward buckling of the cover flange, said stationary die means and the cylindrical surface slidably moving axially relative to said inner end portion of the cover flange and said nose portions in continuous back-up relation thereto during said forming stroke movement to maintain the substantially cylindrical form of the stationarily held inner end portion of the cover flange.

3. Apparatus as defined in claim 2 wherein said marginal forming means of the shaping die structure and the forming surfaces of the segment die structure are generally convergently related to form a chamber about the cylindrical surface of the pad die member, with the segment die member forming surfaces extending obliquely and providing a portion beyond the chamber opposing a complementary obliquely formed surface on the marginal forming means of the shaping die structure located radially outwardly beyond and divergently relative to the chamber forming portion of the forming means and engageable with said oblique surfaces of the segment die structure as a stop to limit positively the extent of the forming stroke movement of the shaping die structure.

References Cited in the file of this patent

UNITED STATES PATENTS

| | | |
|---|---|---|
| 893,018 | Schoenborn et al. | July 14, 1908 |
| 2,162,731 | Lyon | June 20, 1939 |
| 2,162,734 | Lyon | June 20, 1939 |
| 2,358,984 | Lyon | Sept. 26, 1944 |
| 2,662,499 | Lyon | Dec. 15, 1953 |
| 2,707,449 | Lyon | May 3, 1955 |
| 2,878,769 | Lyon | Mar. 24, 1957 |

FOREIGN PATENTS

| | | |
|---|---|---|
| 469,279 | Canada | Nov. 14, 1950 |
| 471,604 | Canada | Feb. 20, 1951 |